United States Patent [19]

Nishioka et al.

[11] Patent Number: 4,477,581

[45] Date of Patent: Oct. 16, 1984

[54] HIGH PERMITTIVITY CERAMIC COMPOSITIONS

[75] Inventors: Goro Nishioka, Yawata; Hiroshi Komatsu, Takefu; Yukio Sakabe, Kyoto, all of Japan

[73] Assignee: Murata Manufacturing Co., Ltd., Kyoto, Japan

[21] Appl. No.: 519,908

[22] Filed: Aug. 3, 1983

[30] Foreign Application Priority Data

Aug. 4, 1982 [JP] Japan ................ 57/135931

[51] Int. Cl.³ .................... C04B 35/46
[52] U.S. Cl. .................... 501/137; 501/138; 501/139
[58] Field of Search ............... 501/137–139

[56] References Cited

U.S. PATENT DOCUMENTS 4,379,854 4/1983 Soong ................ 501/139
4,386,985 7/1983 Dirstine ................ 501/139

Primary Examiner—James Poer
Attorney, Agent, or Firm—Birch, Stewart, Kolasch & Birch

[57] ABSTRACT

A high permittivity ceramic composition consisting essentially of a main component expressed by the general formula:

$$(Ba_{1-x}Me_x)(Ti_{1-y}Me'_y)O_3$$

wherein
Me is Ca and/or Sr, Me' is Zr and/or Sn, x and y are respective mole fractions of Me and Me', $0.06 \leq x \leq 0.14$, and $0.06 \leq y \leq 0.14$; and
a secondary component consisting essentially of 65 to 90 mol % of $PbTiO_3$, 1 to 10 mol % of $Pb_5Ge_3O_{11}$ and 1 to 30 mol % of $Bi_2Ti_2O_7$, the content of the secondary component being 5 to 15 weight percent of the amount of the main component.

1 Claim, No Drawings

HIGH PERMITTIVITY CERAMIC COMPOSITIONS

BACKGROUND OF THE INVENTION

1. Field of the Invention

The present invention relates to high permittivity ceramic compositions and, more particularly, to high permittivity ceramic compositions that can be sintered at relatively low firing temperature.

2. Description of the Prior Art

Dielectric ceramics of a barium titanate system with a permittivity of 6000 to 10000 have been used as a dielectric material for high permittivity ceramic capacitors and monolithic ceramic capacitors. These ceramic compositions have high sintering temperatures ranging from 1300° to 1400° C. so that they consume a large amount of energy. Also, when manufacturing monolithic capacitors with these ceramic compositions, it is required to use noble metals such as Pd and Pt as a material for internal electrodes. In general, monolithic ceramic capacitors have been manufactured by forming dielectric green sheets, screening internal electrodes on the respective green sheets, stacking and pressing the green sheets to form a monolithic body, firing the monolithic body, and then forming external electrodes on opposing ends of the sintered body so as to be connected with the respective internal electrodes. Since the internal electrodes are heated up to the sintering temperature of the dielectric materials, a material for the internal electrodes is required to have a high melting point and high chemical and physical stabilities under the sintering conditions of the dielectrics. Only the noble metals can meet these requirements. Accordingly, it is impossible to manufacture inexpensive ceramic capacitors that are small in size but large in capacitance.

It is therefore an object of the present invention to provide high permittivity ceramic compositions which have high permittivity of not less than 6000 and can be sintered at temperatures not more than 1200° C.

Another object of the present invention is to provide a high permittivity ceramic composition that makes it possible to produce inexpensive monolithic ceramic capacitors of a small size and large capacitance.

According to the present invention there is provided a high permittivity ceramic composition consisting essentially of a main component expressed by the general formula:

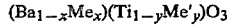

$$(Ba_{1-x}Me_x)(Ti_{1-y}Me'_y)O_3$$

wherein

Me is Ca and/or Sr, Me' is Zr and/or Sn, x and y are respective mole fractions of Me and Me', $0.06 \leq x \leq 0.14$, and $0.06 \leq y \leq 0.14$; and a secondary component consisting essentially of 65 to 90 mol % of $PbTiO_3$, 1 to 10 mol % of $Pb_5Ge_3O_{11}$ and 1 to 30 mol % of $Bi_2Ti_2O_7$. The secondary component is contained in the ratio of 5 to 15 parts by weight to 100 parts by weight of the main component. In other words, the content of the secondary component is 5 to 15 weight percent of the amount of the main component.

DETAILED DESCRIPTION OF THE INVENTION

The high permittivity ceramic compositions of the present invention may be prepared in the well-known manner, for example, by weighing and mixing raw materials, shaping the resultant mixture, and firing the shaped bodies in air at a temperature ranging from 1050° to 1200°. As raw materials, there may be employed those such as carbonates, oxides or other compounds of the above elements which finally provide the corresponding oxides in the composition.

The reasons why the mole fractions, i.e., x and y, of Me and Me' in the main components have been limited as being within the range described above are as follows: If the mole fraction of Me (Ca and/or Sr), i.e., x is less than 0.06, it causes decrease of the permittivity and makes it impossible to produce dielectric ceramics with high permittivity. If x is more than 0.14, it causes difficulty in sintering of the ceramics and makes it impossible to produce dense ceramics. If the mole fraction of Me', y, is less than 0.06, it causes deterioration of the permittivity and makes it impossible to produce dielectric ceramics with high permittivity. If y is more than 0.14, it causes difficulty in sintering of the ceramics and makes it impossible to produce dense ceramics.

The reasons why the content of the secondary component has been limited within the range of 5 to 15 weight percent of the amount of the main component are that a secondary component less than 5 weight percent does not contribute to improvement in the sintering properties of the composition, and a secondary component more than 15 weight percent causes deterioration of the permittivity. The content of $PbTiO_3$ in the secondary component has been limited as being within the range of 65 to 90 mol % for the following reasons. If the content of $PbTiO_3$ is more than 90 mol %, it causes decrease of the permittivity and increase of the dielectric loss. If the content of $PbTiO_3$ is less than 65 mol %, it causes deterioration of sintering properties and a decrease of the permittivity. The content of $Pb_5Ge_3O_{11}$ has been limited as being within the range of 1 to 10 mol % for the following reasons. If the content of $Pb_5Ge_3O_{11}$ is less than 1 mol %, it causes decrease of the permittivity and elevation of the sintering temperature. If its content is more than 10 mol %, it causes decrease of the permittivity. The content of $Bi_2Ti_2O_7$ has been limited as being within the range of 1 to 30 mol % for the reasons that a content less than 1 mol% causes decrease of the permittivity and increase of the dielectric loss, and that the content more than 30 mol % causes elevation of the sintering temperature.

The high permittivity ceramic compositions of the present invention possess a high permittivity ranging from 6000 to 10000 and low dielectric loss, and can be sintered at low temperatures ranging from 1050° to 1150°. The composition of the present invention has lower sintering temperatures as compared with the prior art compositions, so that it is possible to reduce the energy consumption and to employ inexpensive materials such as, for example, Ag alloys including Ag-Pd alloy as a material for internal electrodes of the monolithic ceramic capacitors. According to the present invention it is possible to produce inexpensive ceramic capacitors which are small in size but large in capacitance.

The invention will be further apparent from the following descriptions with reference to the examples.

EXAMPLES

As starting raw materials there were used $BaCO_3$, $CaCO_3$, $SrCO_3$, $TiO_2$, $ZrO_2$, $SnO_2$, $Bi_2O_3$, $Pb_3O_4$ and $GeO_2$. These raw materials were weighed in compositional proportions shown in Table 1, and ball-milled by the wet process for 16 hours, dried, and then calcined at 950° C. for 2 hours so as not to occur deviation of the compositional proportions. The resultant presintered body was crushed, milled and then granulated with 5 weight % of polyvinyl alcohol binder, and then dry-pressed into discs with a 12 mm diameter and a 1 mm thick under a pressure of 2000 kg/cm². Each disc was fired for 2 hours in air at a temperature shown in Table 1, coated with Ag paste on its opposed surfaces, and then baked at 950° C. to form the electrodes.

The thus prepared specimens were subjected to measurements of the permittivity and dielectric loss (tan δ) at 1 KHz and 25° C. The results are also shown in Table 1. In the table, asterisks (*) denote the compositions out of the scope of the present invention.

TABLE 1

| Sample No. | composition (mol %) main component (mol %) | | | | | | secondary component (mol %) | | | content of sec. comp. (wt %) | sintering temp. (°C.) | permittivity (ε) 25° C. | tan δ (%) |
|---|---|---|---|---|---|---|---|---|---|---|---|---|---|
| | BaO | CaO | SrO | TiO₂ | ZrO₂ | SnO₂ | PbTiO₃ | Pb₅Ge₃O₁₁ | Bi₂Ti₂O₇ | | | | |
| 1 | 90 | 10 | 0 | 90 | 10 | 0 | 85 | 5 | 10 | 10 | 1130 | 9500 | 1.00 |
| 2 | 94 | 6 | 0 | 90 | 10 | 0 | 65 | 8 | 27 | 10 | 1100 | 9800 | 1.23 |
| 3 | 86 | 14 | 0 | 90 | 10 | 0 | 65 | 5 | 30 | 10 | 1050 | 9300 | 0.89 |
| 4 | 90 | 5 | 5 | 90 | 5 | 5 | 85 | 10 | 5 | 10 | 1080 | 8700 | 0.50 |
| 5 | 90 | 0 | 10 | 94 | 6 | 0 | 85 | 10 | 5 | 10 | 1140 | 9500 | 1.10 |
| 6 | 90 | 10 | 0 | 86 | 12 | 2 | 75 | 5 | 20 | 10 | 1120 | 9000 | 1.35 |
| 7 | 90 | 0 | 10 | 90 | 10 | 0 | 90 | 5 | 5 | 10 | 1070 | 9000 | 1.50 |
| 8 | 90 | 10 | 0 | 90 | 10 | 0 | 65 | 5 | 30 | 10 | 1110 | 8500 | 0.50 |
| 9 | 90 | 10 | 0 | 90 | 10 | 0 | 81 | 1 | 18 | 10 | 1150 | 7300 | 0.85 |
| 10 | 90 | 10 | 0 | 90 | 10 | 0 | 90 | 9 | 1 | 10 | 1130 | 9800 | 1.24 |
| 11 | 90 | 10 | 0 | 90 | 10 | 0 | 75 | 5 | 20 | 15 | 1050 | 7800 | 0.50 |
| 12 | 90 | 10 | 0 | 90 | 10 | 0 | 75 | 5 | 20 | 5 | 1150 | 10000 | 1.30 |
| 13* | 90 | 10 | 0 | 90 | 10 | 0 | 0 | 0 | 0 | 0 | 1360 | 9800 | 0.85 |
| 14* | 84 | 16 | 0 | 84 | 16 | 0 | 75 | 5 | 20 | 10 | | unsintered | |
| 15* | 90 | 10 | 0 | 86 | 14 | 0 | 95 | 3 | 2 | 10 | 1100 | 4600 | 3.75 |
| 16* | 90 | 10 | 0 | 90 | 10 | 0 | 75 | 5 | 20 | 20 | 1080 | 3800 | 0.73 |
| 17* | 90 | 10 | 0 | 90 | 10 | 0 | 85 | 0 | 15 | 10 | 1200 | 5000 | 2.00 |
| 18* | 90 | 10 | 0 | 90 | 10 | 0 | 70 | 15 | 15 | 10 | 1130 | 4200 | 1.08 |
| 19* | 98 | 2 | 0 | 98 | 2 | 0 | 75 | 5 | 20 | 10 | 1140 | 3000 | 0.50 |
| 20* | 90 | 10 | 0 | 92 | 8 | 0 | 60 | 10 | 30 | 10 | 1220 | 4800 | 0.35 |
| 21* | 90 | 10 | 0 | 92 | 8 | 0 | 65 | 1 | 34 | 10 | 1250 | 6000 | 0.37 |
| 22* | 90 | 10 | 0 | 92 | 8 | 0 | 90 | 10 | 0 | 10 | 1170 | 8300 | 3.12 |

As can be seen from the results shown in Table 1, the ceramic compositions of the present invention possess high permittivity more than 6000 and low dielectric loss comparable to those of the prior art and can be sintered at considerably low temperatures as compared with those of the prior art.

Since it is obvious that many changes and modifications can be made in the above-described details without departing from the nature and spirit of the invention, it is to be understood that the invention is not limited to said details except as set forth in the appended claims.

What is claimed is:

1. A high permittivity ceramic composition consisting essentially of a main component expressed by the general formula:

$$(Ba_{1-x}Me_x)(Ti_{1-y}Me'_y)O_3$$

wherein
Me is Ca and/or Sr, Me' is Zr and/or Sn, x and y are respective mole fractions of Me and Me', $0.06 \leq x \leq 0.14$, and $0.06 \leq y \leq 0.14$; and a secondary component consisting essentially of 65 to 90 mol % of PbTiO₃, 1 to 10 mol % of Pb₅Ge₃O₁₁ and 1 to 30 mol % of Bi₂Ti₂O₇, the content of said secondary component being 5 to 15 weight percent of the amount of the main component.

* * * * *